Dec. 16, 1969   F. M. BAILEY ET AL   3,484,687
DISTANCE SENSING SYSTEM FOR RAILROADS BASED
ON TRACK INDUCTANCE CHARACTERISTICS
Filed March 9, 1967   5 Sheets-Sheet 1
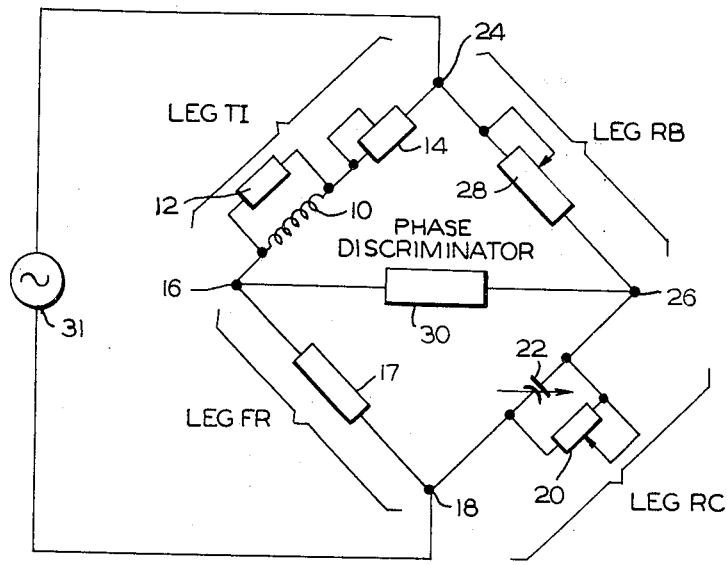
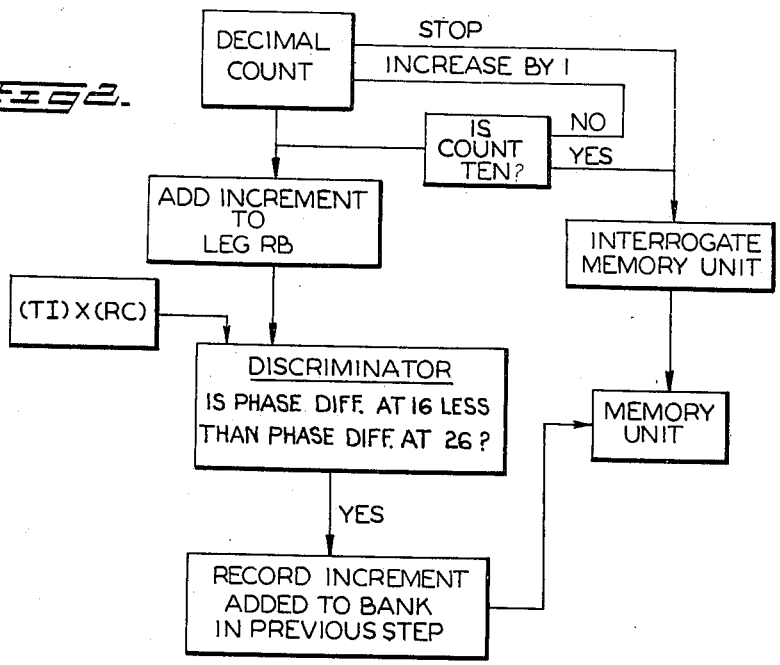
INVENTOR.
FRANCIS M. BAILEY
WILLIAM E. CRONQUIST
BY
Gerald L. Woods Dec. 16, 1969    F. M. BAILEY ET AL    3,484,687
DISTANCE SENSING SYSTEM FOR RAILROADS BASED
ON TRACK INDUCTANCE CHARACTERISTICS
Filed March 9, 1967    5 Sheets-Sheet 2

AND GATE

OR GATE

INVERTER

FLIP-FLOP

BINARY COUNTER

SINGLE SHOT

*INVENTOR.*
FRANCIS M. BAILEY
WILLIAM E. CONQUIST
BY
Gerald R. Woods

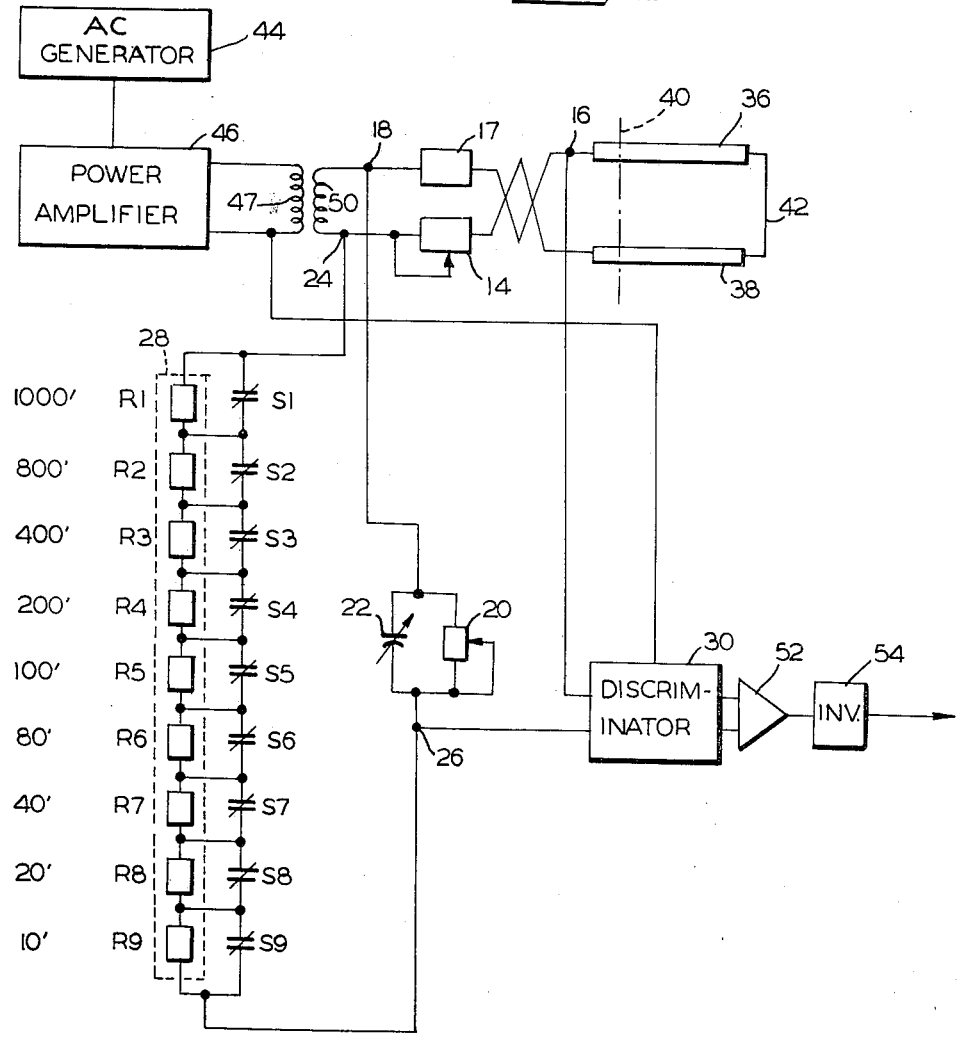
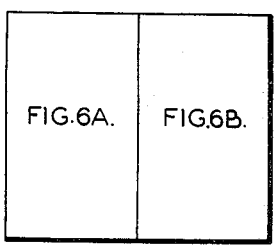

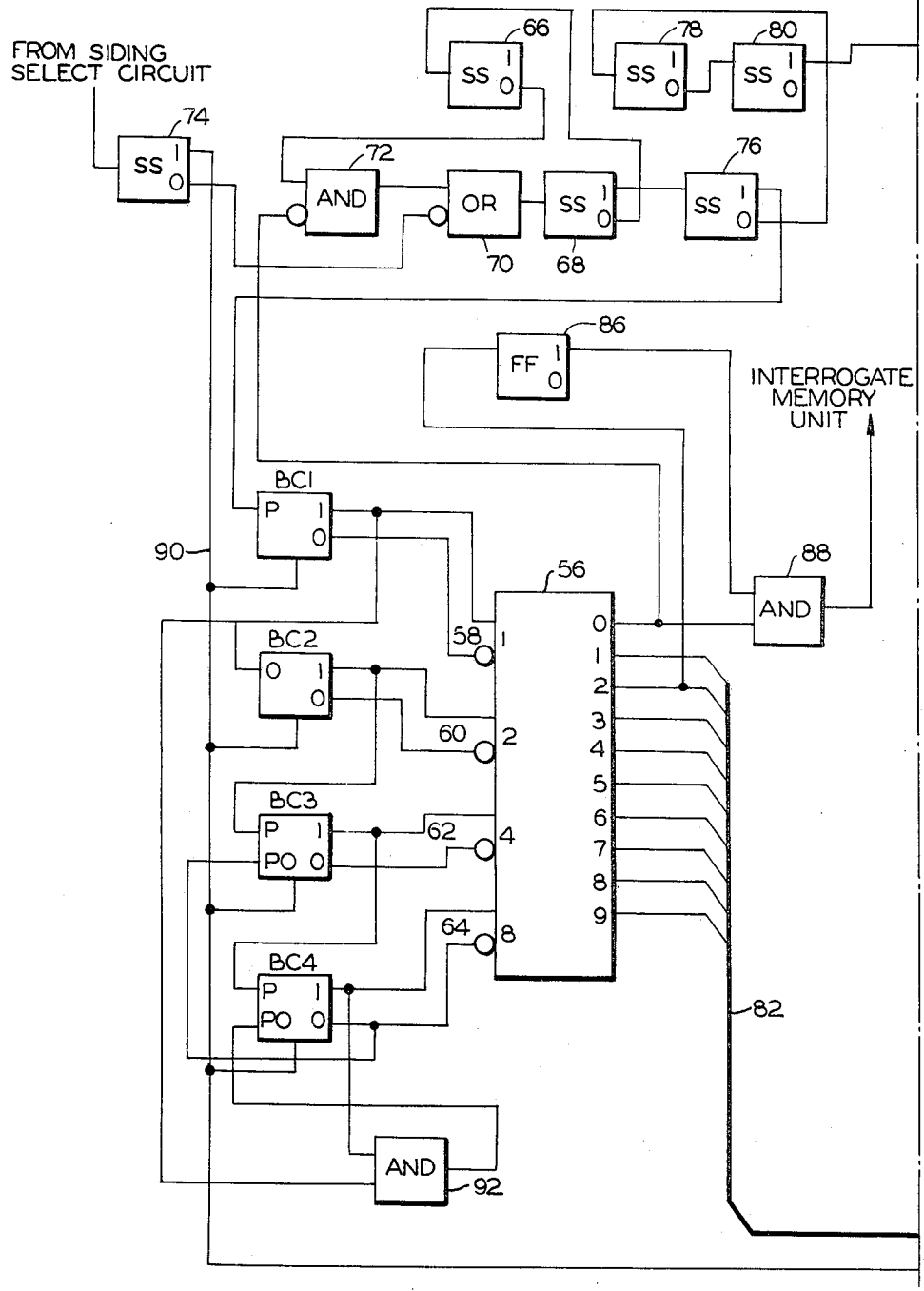

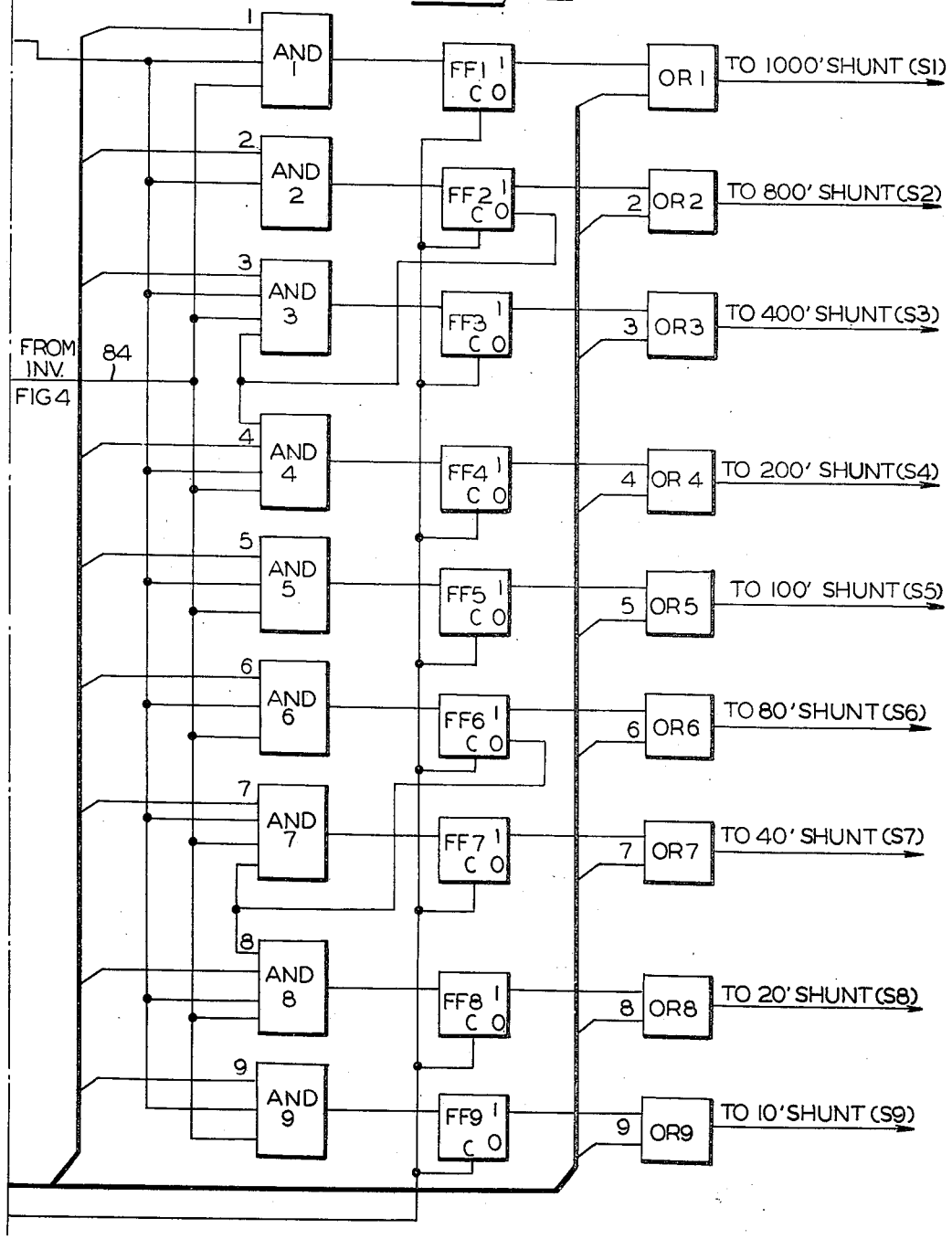

United States Patent Office 3,484,687
Patented Dec. 16, 1969

3,484,687
DISTANCE SENSING SYSTEM FOR RAILROADS BASED ON TRACK INDUCTANCE CHARACTERISTICS
Francis M. Bailey and William E. Cronquist, Roanoke, Va., assignors to General Electric Company, a corporation of New York
Filed Mar. 9, 1967, Ser. No. 621,930
Int. Cl. G01n 27/02
U.S. Cl. 324—71                                    8 Claims

ABSTRACT OF THE DISCLOSURE

An A-C excited bridge for determining the distance from a point on a railroad siding to the nearest car on that siding by measuring track inductance. The left side of the bridge has a first leg which includes the inductance and resistance of the siding measured at the point and a second serially-connected leg which has a fixed resistance. The right side of the bridge has a third leg with an RC parallel combination and a fourth leg with a resistor bank with several normally-shunted, binary-weighted resistors. The resistor bank magnitude is varied in steps by temporarily removing the shunt from successively smaller resistors. At each step, a phase discriminator compares the voltage-current phase difference at the junction of the first and second legs with the phase difference at the junction of the third and fourth legs. If the first phase difference is less, the shunt across the resistor added in that step remains opened. The resistor bank magnitude at the end of the sequence is proportional to the distance to be determined.

BACKGROUND OF THE INVENTION

The present invention relates to distance sensing systems and more particularly to distance sensing systems for use in railroad classification yards and the like.

In gravity-feed railroad classification yards, incoming trains are pushed by a yard locomotive to the crest of an incline where the cars are separated or cut singly or in small groups according to destination and are allowed to accelerate under the influence of gravity along a 3–4% downgrade. At some point along this downgrade, the cars are shunted to one of several sidings to make up new trains in which the cars are grouped according to their destination. Each car entering a siding must be rolling fast enough to contact and become coupled to a car already on the siding, but must not be rolling so fast that it slams into the car already on the siding. Obviously, such slamming may play havoc with the cargo in each car.

The speed of each car entering a siding is controlled by retarders or brakes which are mounted along the tracks where they bear on the wheels of the entering car as it passes. Several factors are taken into account in determining the amount of braking force which the retarders should apply to an entering car. These factors include the number of cars coupled together in a single cut, the weight of the cars in a cut, the resistance of those cars to rolling, the ambient temperature, the wind direction and strength, and the distance which the cars must travel on the siding to reach cars previously shunted there. The distance from the entrance to a siding to the nearest car on that particular siding has heretofore generally been estimated by yard workers based upon their visual observations. Since the length of sidings is usually at least 2000 feet, such observations are understandably not always accurate. Attempts have been made to determine distances by measuring the shunt resistance of the tracks on the siding, but this has not proven entirely satisfactory since the track shunt resistance may vary widely with differences in weather and in the condition of the track bed. Neither the visual readings nor the resistance readings are thought to be completely satisfactory for use in either non-automated or automated classification yards where data processing equipment is used to take into account all of the factors mentioned above in automatically determining the amount of braking force to be exerted by the retarders on each entering car.

SUMMARY OF THE INVENTION

The present invention is a method and means for carrying out the method of determining the distance from a reference point on a railroad siding to the nearest car on that siding. The determination is accurate and is relatively unaffected by ambient weather or conditions such as that of the track bed. The method is based on the fact that inductance per unit length of a railroad siding is a measurable quantity that remains relatively constant under all conditions. When the inductance per unit length is known, the total inductance is measured and is divided by the inductance per unit length to yield the distance to the nearest car in terms of unit length.

A system for carrying out this method includes first circuit means for producing a first electrical signal having a voltage-current phase difference proportional to the inductance (and length) of the track measured from the reference point to the nearest car and second capacitive circuit means for producing a second electrical signal having a voltage-current phase difference proportional to the impedance of an adjustable resistor bank. A sequencing unit varies incrementally the magnitude of the adjustable resistor bank in a predetermined sequence. At each step in the sequence, a phase discriminator compares the phase difference of the first signal with the phase difference of the second signal and produces a hold signal when the phase difference of the first signal is less. A third circuit means responds to each hold signal to cause the increment added to the resistor bank to remain in circuit for the remainder of the sequence. The final recorded magnitude of the resistor bank is directly proportional to the distance from the reference point to the nearest car on the siding.

DESCRIPTION OF THE DRAWINGS

While the specification concludes with claims particularly pointing out and distinctly claiming that which is regarded as the present invention, the details of the invention along with its further objects and advantages may be more readily ascertained from the following detailed description when read in conjunction with the accompanying drawings in which:

FIGURE 1 is a simplified schematic diagram of a bridge circuit constructed in accordance with the principles of the present invention;

FIGURE 2 is a flow diagram for use in illustrating the operation of a bridge circuit constructed in accordance with the principles of the present invention;

FIGURE 4 indicates the proper positioning of FIGURE 6 and 6A.

FIGURE 5 is a partially schematic logic diagram showing a bridge circuit constructed in accordance with the principles of the present invention;

FIGURE 6 is the left half of a sequencing circuit for use in combination with the bridge circuit shown in FIG. 5; and FIGURE 6A is the right half of that sequencing circuit.

DETAILED DESCRIPTION

Description of functional operation

Figure 3A:
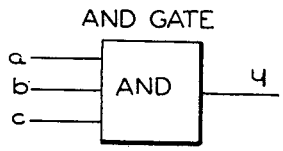
FIGURE 3 shows the more common logic element symbols and drafting conventions used in the logic circuit drawings.

The distance to the nearest car is determined, once inductance per unit length is known, by measuring total inductance and dividing total inductance by inductance per unit length to yield distance in terms of unit length.

FIGURE 1 is a simplified bridge for carrying out this method. The track impedance is represented in a leg TI as an inductor 10 shunted by a resistor 12. The parallel combination represents the impedance of both track rails extending from the reference point to the first axle of the first car, which acts as a short circuit from one rail to the other. The parallel combination is connected in series with an adjustable resistor 14 which is used to compensate for differences in lead lengths from each of the sidings in the classification yard to a central location at which the remaining elements of the bridge are found. The lower end of the leg TI is connected at a junction 16 to the upper end of a leg FR containing a fixed value resistor 17. The leg FR is, in turn, connected at a junction 18 to a parallel combination of an adjustable resistor 20 and an adjustable capacitor 22. The fourth leg of the bridge is leg RB which is connected to the leg TI at a junction 24 and to the leg RC at a junction 26. Leg RB contains an incrementally-adjustable impedance or resistor bank 28 consisting of nine resistors having different distance-weighted values. A phase discriminator 30 is connected across the bridge from the junction 16 to the junction 26. The bridge is excited by an A-C voltage supplied at the junctions 18 and 24 by a power supply 31. This A-C excitation gives rise to a first electrical signal having a phase difference proportional to the track length and a second electrical signal having a phase difference proportional to the magnitude of the adjustable impedance and the magnitude of the capacitor.

The distance to the nearest car on the siding from the reference point, which may be at the final retarder near the entrance to the siding, is determined by balancing the bridge shown in FIG. 1. The magnitude and phase angle of the impedance presented by the leg TI of the bridge varies with the distance to be determined. Although the track does not display pure inductance and has both series and distributed shunt resistance represented by the resistor 12, the inductance of the track complex impedance has been found to vary directly with track length. Measurements have revealed that track inductance at one siding varied at a rate of $0.46\mu$ h./ft. regardless of weather or track bed conditions. Since the voltage-current phase difference caused by the track inductance varies with track length, measurement of this phase difference provides an accurate indication of track length.

The process by which the bridge is balanced is illustrated by the flow chart of FIGURE 2. At the beginning of each distance-determining sequence, the decimal count is zero and the adjustable impedance is short circuited by a normally-closed shunt. At the decimal count of one, an impedance is temporarily established in the leg RB. A determination is made by the phase discriminator 30 of whether the value of the impedance is great enough to cause the phase difference in the right leg of the bridge to exceed the phase difference in the left leg. If the former phase difference is greater, the impedance remains in circuit in the leg RB for the remainder of the sequence in response to a signal from the phase discriminator 30. The signal from the discriminator 30 also causes a memory unit to record that the particular increment remained in the circuit.

The decimal count then increases by one and another smaller increment is added to resistor bank 28. The determination is again made whether the phase difference of the left side of the bridge is less than the phase difference of the right side with the series combination of the largest and next largest increments therein. If it is, the next largest increment remains in the circuit for the duration of the sequence. If at any step during the sequence, the magnitude of the increment added to the resistor bank 28 causes the phase difference of the right side to become less than the phase difference of the left side, that increment is taken out of the circuit. The sequence is repeated with the decimal count increasing in steps of one until the count of ten is reached. At the count of ten a stop signal is generated. At the same time, a signal is produced which calls for the interrogation of the memory unit. The information recorded in the memory unit yields a signal related to the distance from the reference point on the siding to the nearest car.

Symbols and nomenclature

The logic circuitry used to automatically balance the bridge in the above discussed sequence is described below. In the following description, the term ZERO signal refers to a signal at ground potential or zero voltage whereas the term ONE signal refers to a signal having a fixed voltage, usually ±6 volts.

Figure 3B:
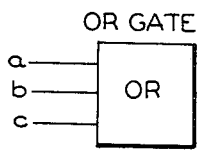
Figure 3C:
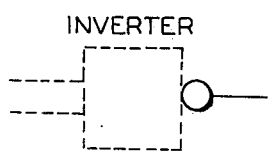
Figure 3D:
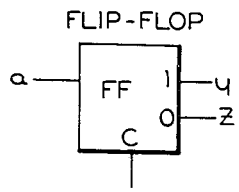
Figure 3E:
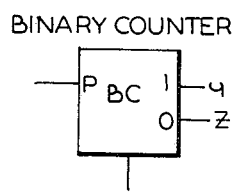
Figure 3F:
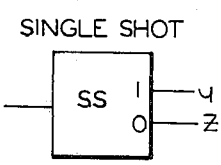
Figure 3G:
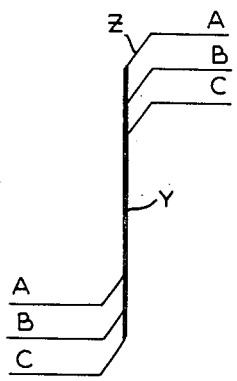
Figure 3H:
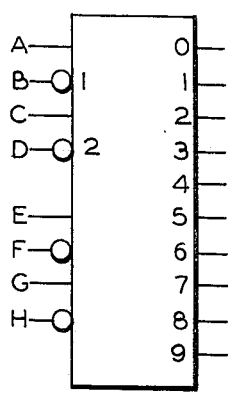

The symbols shown in FIGURES 3A and 3H and described hereafter are the common logic elements and drafting conventions to be used in the detailed decription of the logic circuits. The input terminals for all of the elements shown are on the left side or at the top of the symbol whereas the output terminals are shown on the right side of the symbol.

AND gate

FIGURE 3A shows an AND gate having a plurality of input terminals A, B, and C and a single output terminal Y. A ONE signal is produced at the output terminal Y only if ONE signals are present on all of the input terminals A, B, and C. If any or all of the input terminals have a ZERO signal, the signal at the output terminal is also a ZERO signal.

OR gate

FIGURE 3B shows an OR gate having a plurality of input terminals A, B, and C and a single output terminal Y. If a ONE signal appears on any of the input terminals, a ONE signal appears on the output terminal Y. If none of the input terminals have ONE signals, a ZERO signal appears on the output terminal Y.

Inverter

FIGURE 3C shows an inverter symbol, a small circle which appears either at an input terminal of an element such as an AND gate or an OR gate. The inverter changes the level of any signal applied to it. For instance, if a ONE signal is applied at the left side of the inverter shown in FIGURE 3C, a ZERO signal appears at the right side. Conversely, if a ZERO signal is applied at the left side of the inverter, a ONE signal appears at the right side.

Flip-flop

FIGURE 3D shows a flip-flop, a bistable device having a normal output terminal Y, an inverted output terminal Z, a pulse input terminal A, and a clearing input terminal C. If a ONE signal is applied to the pulse input terminal A while a ZERO signal is applied to the clearing input terminal C, the normal output terminal Y has a ONE signal and the inverted output terminal Z has a ZERO signal. The device remains in this state even though the ONE signal is removed from the pulse input terminal A until a ONE signal is applied to the clearing input terminal C. The ONE signal at the clearing input terminal C causes the flip-flop to be reset so that a ZERO signal appears on the normal output terminal Y and a ONE signal appears on the inverted output terminal Z. The flip-flop does not change its state when the same signals are applied simultaneously to the pulse input terminal A and the clearing input terminal C.

Binary counter

FIGURE 3E shows a binary counter having a normal output terminal Y, an inverted output terminal Z, a clearing input terminal C, and a pulse input terminal P. When a ONE signal is applied to the pulse input terminal P the signals on the output terminals of the binary counter are inverted. That is, if a ONE signal appears on the output terminal Y and a ZERO signal appears on the output terminal Z, the application of a ONE signal to the pulse input terminal P will cause the signal on the output terminal Y to go to ZERO and the signal on the output terminal Z to go to ONE. If a ONE signal is applied to the clearing terminal C, the signal on the output terminal Z rises to ONE and the signal on the output terminal Y falls to ZERO. If ONE signals are applied simultaneously to the pulse input terminal P and the clearing terminal C, both output terminals Y and Z produce ZERO signals.

FIGURE 3F shows a single shot having a normal output terminal Y, and inverted output terminal Z and a single input terminal A. When the leading edge of a ONE signal is applied to input terminal A, the signal on the output terminal Y rises to ONE for a predetermined period of time while the signal on the output terminal Z falls to ZERO. At the end of the predetermined period, the signal on the output terminal Y falls to ZERO and the signal on the output terminal Z goes to ONE. The signal on the output terminal Y remains at ZERO and the signal on the output terminal Z remains at ONE except when the single shot is triggered by the leading edge of a ONE signal.

Trunk lines

FIGURE 3G shows a trunk line, a drafting convention used to reduce the number of wires in patent drawings. Three individual conductors A, B, and C extend from opposite ends of a trunk line Y which may be recognized by the thickness of the line representing it. The wires are electrically insulated from one another in this trunk line and are identified at each end by suitable reference numerals, such as A, B, C. Conductor entries into and exits from trunk lines may be distinguished from conventional electrical crossovers and connections by the slanted junctions Z between the individual conductors and the trunk line Y.

Translator

FIGURE 3H shows a translator which accepts a binary-coded input and transforms it to a decimal-coded output. The translator produces ONE or ZERO signals from 10 decimal output terminals in response to various combinations of ONE and ZERO signals at four pairs of normal and inverse input terminals. For example, a ONE signal appears at the output terminal 1 if a ONE signal is applied to the normal input terminal A and to the inverse input terminals D, F, and H while ZERO signals are applied to the inverse input terminal B and normal input terminals C, E, and G. A complete truth table for the translator is shown below.

| Binary-coded input | | | | | | | | Decimal output |
|---|---|---|---|---|---|---|---|---|
| 8 | | 4 | | 2 | | 1 | | |
| N | I | N | I | N | I | N | I | "1" ON |
| 0 | 1 | 0 | 1 | 0 | 1 | 0 | 1 | 0 |
| 0 | 1 | 0 | 1 | 0 | 1 | 1 | 0 | 1 |
| 0 | 1 | 0 | 1 | 1 | 0 | 0 | 1 | 2 |
| 0 | 1 | 0 | 1 | 1 | 0 | 1 | 0 | 3 |
| 0 | 1 | 1 | 0 | 0 | 1 | 0 | 1 | 4 |
| 0 | 1 | 1 | 0 | 0 | 1 | 1 | 0 | 5 |
| 0 | 1 | 1 | 0 | 1 | 0 | 0 | 1 | 6 |
| 0 | 1 | 1 | 0 | 1 | 0 | 1 | 0 | 7 |
| 1 | 0 | 0 | 1 | 0 | 1 | 0 | 1 | 8 |
| 1 | 0 | 0 | 1 | 0 | 1 | 1 | 0 | 9 |

N is normal input terminal.
I is inverted input terminal.

Description of logic circuits

FIGURE 5 shows in more detail the bridge circuit revealed schematically in FIGURE 1. Where junctions and elements in FIGURE 5 also appeared in FIGURE 1 they are given the same numbers. The inductance and resistance of the track cannot be shown in FIGURE 5 as these are parameters of the track rails 36 and 38 measured from a reference line 40 either to the first axle of the nearest car on the tracks or to a short circuit 42 connecting the rails 36 and 38. The short circuit 42 is located, in a preferred embodiment, at a terminal distance from the reference point 40. To minimize inaccuracies due to discontinuities, the rails 36 and 38 are bonded for this distance. That is, the joints between abutting sections of track are welded or otherwise connected to provide an electrically continuous conductor.

The bridge is excited by an A-C generator 44 that produces a voltage at 270 c.p.s. and applies this voltage to a power amplifier 46, the output of which is connected to the primary winding 47 of an isolating transformer 48. The secondary winding 50 of the isolating transformer 48 is connected across the bridge at junctions 18 and 24 to cause an A-C voltage to be established across the bridge leg containing the parallel combination of resistor 20 and capacitor 22 and the bridge leg containing resistor bank 28 as well as across the leg with the track impedance and the leg with the resistor 17. The resistance bank 28 includes a plurality of resistors R1–R9 each of which is shunted by normally-closed contacts of shunts S1–S9, respectively. The magnitudes of the resistors R1–R9 in the resistor bank 28 are weighted to represent various track lengths. For example, the magnitude of R1, representing 1000 feet, is 10 times that of R5, representing 100 feet.

At the start of a distance-determining sequence, the shunt S1 is opened temporarily to bring only the resistor R1 into the bridge circuit. A determination is made by the discriminator 30 whether the phase difference at the middle of the left side of the bridge (referred to hereafter as the track phase difference) is less than the phase difference at the middle of the right side (referred to hereafter as the bank phase difference). If the track phase difference is less, a ZERO signal is generated by discriminator 30, amplified by amplifier 52 and inverted by inverter 54. The resultant ONE signal is applied to sequencing circuitry to be described which causes the shunt S1 to remain open for the duration of the sequence. At the next step in the sequence, the shunt S2 bypassing resistor R2 is temporarily opened and a determination is made whether the track phase difference is still less than the bank phase difference, now determined by the magnitude of resistors R1 and R2. If the track phase difference is less, the shunt S2 is caused to remain open for the remainder of the sequence.

At the third step in the sequence, the shunt S3 is temporarily opened and a determination is again made as to which phase difference is greater. If the series combination of resistors R1, R2 and R3 causes the bank phase difference to become less than the track phase difference, the discriminator 30 produces a ONE signal which is amplified by the amplifier 52 and is inverted by the inverter 54 to produce a ZERO signal. When this ZERO signal is applied to the sequencing circuit, the shunt S3 is permitted to reclose, thereby short circuiting resistor R3 and leaving only resistors R1 and R2 in the resistor bank 28. At the fourth step in the sequence, the shunt S4 is temporarily opened and a determination is made if the series combination of resistors R1, R2 and R4 causes the bank phase difference to become less than the phase difference. If the track phase difference is less, the ZERO signal produced by the discriminator 30 is inverted by the inverter 54 to produce a ONE signal which causes the shunt S4 to remain open for the duration of the sequence.

The sequence is repeated for resistors R5 through R9 with the shunts S5 through S9 being opened temporarily in progression and a determination being made at each step to see if the series combination of the resistor added during that step with the earlier added resistors causes the bank phase difference to exceed the track phase difference. When the track phase difference is less at a step in the sequence, the shunt bypassing the resistor added during that step is caused to remain open for the duration of the sequence. Otherwise, the shunt is allowed to reclose to take the added resistor out of circuit. At the end of the sequence, or when all nine shunts S1–S9 have been temporarily opened and determinations made, the sequencing circuit generates a command to a computer to scan a memory unit which may consist of a series of shunts such as S1 through S9. A signal proportional to the distance from the reference point to the first car on the siding may be derived by determining which of the shunts is in other than its normal position.

To illustrate the distance determining sequence described above, assume that the first car on a railroad track at a distance of 1530 feet from the reference point on a 2,000 foot track. In the first step in the sequence R1, which is weighted to represent 1000 feet of track, is brought into the resistor bank, and a determination is made whether the bank phase difference is less than the track phase difference. Since it is not, the shunt S1 remains open. In the second step in the sequence, resistors R1 and R2, representing 1800 feet of track, are in the resistor bank. Since the bank phase difference is less than the track phase difference in the second step, the shunt S2 is allowed to reclose after being temporarily opened. In the third step of the sequence, the shunt S3 is temporarily opened and a determination is made whether the combination of resistors R1 and R3, representing 1400 feet of track, causes the bank phase difference to be less than the track phase difference. Because it is not, the shunt S3 is caused to be held open for the remainder of the sequence. These steps are repeated for the remainder of the resistors in the resistor bank 28. The result is that the following resistors will be serially connected in the resistance bank at the end of the sequence.

| Resistor: | Represents No. of feet |
|---|---|
| R1 | 1000 |
| R3 | 400 |
| R5 | 100 |
| R8 | 20 |
| R9 | 10 |
|  | 1530 |

The sequencing circuit which controls the condition of the shunts S1–S9 is shown in FIGURES 6 and 7. The sequencing circuit includes a translator 56 having four sets 58, 60, 62 and 64 of binary input terminals, each of which sets consists of a normal input terminal and an inverted input terminal. The normal and inverted input terminals of the set 58 are connected to the normal and the inverted outputs, respectively, of a binary counter BC1 in a binary counting chain which includes binary counters BC2, BC3, BC4. Binary counters BC2, BC3 and BC4 provide input signals to the remaining sets 60, 62, and 64 of input terminals. Each pulse that is applied to binary counter BC1 changes the condition of the binary counters to produce signals which are applied to the binary inputs of the translator 56 to cause a ONE signal to appear at the next higher decimal output than that on which a ONE signal previously appeared. For example, if a ONE signal appeared on output terminal 3 of the translator 56 before a pulse was applied to BC1, the application of that pulse would result in the signal on output terminal 3 going to ZERO and the signal on output terminal 4 rising to ONE.

The pulses applied to the binary counting chain are generated by an oscillator including single shots 66 and 68. The driving elements for the single shot 68 include an OR gate 70 having a normal input terminal connected to the output terminal of an AND gate 72 and an inverted input terminal connected to the "0" terminal of a single shot 74. The AND gate 72 has a normal input connected to the "0" terminal of the single shot 66 and an inverted input terminal connected to the output terminal "0" of the translator 56. An input to the single shot 66 is provided by a connection to the "0" terminal of the single shot 68. The "1" terminal of the single shot 68 provides an input to a single shot 76 having its "1" terminal connected to the pulse input terminal of BC1 and its "0" terminal connected to the input of a single shot 78. The "0" terminal of the single shot 78 in turn is connected to the input of a single shot 80, the "1" terminal of which provides one input to a series of AND gates, AND1–AND9. Each of the gates AND1–AND9 is also connected to a different one of the output terminals of the translator 56 through a trunk line 82. That is, one of the inputs for gate AND1 is the output terminal "1" of the translator 56, one of the inputs for gate AND2 is the output terminal 2, etc. A third input to each of the gates AND1–AND9 is provided through a lead 84 connected to the output of the inverter 54 shown in FIGURE 5.

The outputs of the gates AND1–AND9 provide inputs for similarly-numbered flip-flops FF1–FF9. In turn, the "1" terminals of the flip-flops FF1–FF9 are connected to the inputs of gates OR1–OR9, respectively. Each of the gates OR1–OR9 also has an input from the similarly-numbered output terminal of the translator 56. The "0" terminal of flip-flop FF2 is also connected to one input of gate AND3 and one input of gate AND4. Similarly, the "0" terminal of flip-flop FF6 is connected to one input of gate AND7 and one input of gate AND8. The outputs of each of the gates OR1–OR9 is connected to relay driving circuitry which causes the shunts S1–S9 to remain open whenever a ONE signal exists on the output of its respective OR gate.

The sequencing circuit includes a flip-flop 86 having an input connected to the output terminal 2 of the translator 56. The "1" terminal of the flip-flop 86 provides one input to an AND gate 88, the other input of which is connected to the "0" terminal of the translator 56. The clearing terminal of the flip-flop 86, like the clearing terminals of binary counters BC1–BC4 and flip-flops FF1–FF9 is connected to the "1" output terminal of a single shot 74 through lead 90.

When a siding selection circuit (not shown) applies a pulse to the single shot 74 at the beginning of a distance-determination sequence, a ONE signal of predetermined width appears on output terminal "1" of single shot 74 while the signal on the "0" output terminal of the single shot 74 goes to ZERO for a predetermined period of time. When the signal on the "1" output terminal goes to a ONE level, it causes the flip-flop 86, the binary counters BC1–BC4, and the flip-flops FF1–FF9 to be reset, thereby clearing the circuit of whatever changes had occurred during a preceding distance-determination sequence. When the "0" output terminal of the single shot 74 goes to ZERO, the input at the inverted terminal of the OR gate 70 rises to ONE to cause the OR gate 70 to produce an output pulse which triggers the single shot 68. The triggering of the single shot 68 in turn causes the triggering of the single shot 76 and the consequent application of a pulse to binary counter BC1.

The translator 56 produces a ONE signal at its output terminal 1 and a ZERO signal at the output terminal "0" as well as at each of the remaining output terminals 2 through 9. When the single shot 68 returns to its normal state, the rise from the ZERO to the ONE level at the "0" output terminal causes single shot 66 to be triggered. After a predetermined time lapse, the signal on the "0" output terminal of the single shot 66 returns to its normal ONE level. This signal is applied to one input of the AND gate 72, the other input of which is connected to the "0" output terminal of the translator 56 through an inverter. The inverter transforms the ZERO signal existing on output terminal "0" of the translator 56 to bring both inputs of the AND gate 72 to a ONE level. The ONE signal produced by the AND gate 72 causes OR gate 70 to produce a ONE signal at its output and to trigger single shot 68, thereby restarting the entire cycle. While the single shots 66 and 68 can be adapted to produce pulses at different rates, in a preferred embodiment, the oscillator formed by the single shot produces pulses at a rate of approximately 22 pulses per second.

When the signal on the output terminal "1" of gate OR1 goes from ZERO to ONE, the gate produces a ONE signal at its output which is applied to the 1000 foot shunt S1 to cause that shunt to open temporarily. At the same time, the ONE signal appearing on the output terminal "1" is applied to gate AND1. When the single shot 76 returns to its normal state, the ONE signal on its "0" output terminal triggers the single shot 78 which in turn triggers the single shot 80. The single shot 80 provides a pulse which is delayed for a sufficient amount of time to allow the contacts of the 1000 foot shunt (S1) to settle into place. Before the single shot 80 has caused a ONE signal to be applied to gates AND1–AND9, however, the discriminator 30 determines whether the bank phase difference is less than the track phase difference. If it is not, a ONE signal or hold signal appears at the output of the inverter 54 and is applied through the lead 84 to one input of the gate AND1. Since each of the inputs of the gate AND1 is at a ONE signal level, a ONE signal output is supplied by gate AND1 to flip-flop FF1 to cause that flip-flop to set, thereby providing a fixed ONE signal for the gate OR1. This signal is transmitted through the gate OR1 to the driving circuit for the 1000 foot shunt S1 to cause that shunt to remain open for the duration of the sequence.

When the next pulse appears at the "1" terminal of the single shot 76, the binary counter BC1 changes state and also causes binary counter BC2 to change state. The translator 56 causes the ONE signal previously appearing on output terminal 1 to go to a ZERO level and causes a ONE signal to appear on the output terminal 2. The ONE signal on the output terminal 2 is applied both to gate AND2 and to gate OR2. The application of the ONE signal to gate OR2 causes the shunt S2 bypassing R2, which represents 800 feet of track, to temporarily open and to remain open while a determination is made whether the series combination of resistors R1 and R2 causes the bank phase difference to become less than the track phase difference. If the track phase difference is less, a ONE signal appearing on the lead 84 is applied to one input of gate AND2. Since the single shot 80 provides a delayed ONE signal appearing at the same time as the ONE signal from the inverter 54 and the ONE signal from the output terminal 2 of the translator 56, the gate AND2 produces a ONE signal at its output which causes flip-flop FF2 to set, thereby providing a fixed ONE signal for the gate OR2 to cause the shunt S2 to remain open for the duration of this sequence. When flip-flop FF2 sets, the signal at its "0" terminal goes to ZERO and causes the disabling of gates AND3 and AND4. The reason for this is to prevent the accumulation in the resistor bank 28 of resistances weighted to represent more than 2000 feet of track. For the same reason, the "0" terminal of flip-flop FF6 is connected to the input of gates AND7 and AND8. The signal appearing on output terminal 2 of the translator 56 is also used to set a flip-flop 86 which, in its set state, causes a ONE signal to be applied at one input of AND gate 88. The other input to the AND gate 88 is connected to the output terminal "0" of the translator 56.

When a count of 9 is reached, an AND gate 92 is enabled by the ONE signals on the normal output terminals of binary counters BC1 and BC4. At the next pulse from binary counter BC1 changes state and AND gate 92 is inhibited. The decline of an output signal from the AND gate 92 causes binary counter BC4 to be reset. The consequent appearance of a one signal on the inverted output terminal of BC4 causes BC2 to be reset from the set condition it had assumed due to the pulse which followed a count of 9. With all of the binary counters BC1–BC4 reset, the output of the translator 56 is ZERO so that a ONE signal appears only on output terminal 0. At the appearance of the ONE signal on the output terminal 0, the AND gate 88 produces a ONE signal which is used as a command to cause the interrogation of a memory unit by data processing equipment. At the same time, the ONE signal on the output terminal 0 is inverted at one input of AND gate 72. The AND gate 72 becomes inhibited and halts operation of the oscillator formed by single shots 66 and 68.

What we claim as new and desire to secure by Letters Patent of the United States is:

1. A system for determining the distance from a reference point on a railroad track to the nearest car on that track including:
    (a) a first circuit means for producing a first electrical signal having a current-voltage phase difference proportional to the inductance of the track extending between the reference point and the car;
    (b) a second circuit means including an incrementally-adjustable impedance for producing a second electrical signal having a current-voltage phase difference proportional to the magnitude of said incrementally-adjustable impedance;
    (c) a discriminator circuit for comparing the phase differences of the first and second electrical signals to produce a hold signal when the phase difference of the first electrical signal is less than the second; and
    (d) a sequencing circuit connected to said discriminator circuit and said second circuit means and having first gating means for causing temporary increases of varying magnitudes of said incrementally-adjustable impedance and second gating means for causing those increases which permit the production of a hold signal by said discriminator circuit to remain in effect for the duration of the distance determination sequence.

2. A system as recited in claim 1 wherein said first circuit means includes: a first leg having terminals connected to the opposite rails of the track at the reference point; and a second serially-connected leg with a fixed resistance therein.

3. A system as recited in claim 2 wherein said second circuit means includes: a third leg with a parallel RC combination; and a fourth serially-connected leg including said incrementally-adjustable impedance which comprises a resistor bank having a plurality of serially-connected resistors, each having a magnitude weighted to represent a different distance along the railroad, and a plurality of normally-closed shunts, each of said shunts being connected in parallel with one of said plurality of serially-connected resistors and being adapted to be opened by an output signal from said first gating means in said sequencing circuit.

4. A system as recited in claim 3 wherein:
    (a) said first gating means includes a plurality of OR gates, each having an output terminal electrically connected to a different one of said normally closed shunts, whereby an output signal on any OR gate of said plurality of OR gates causes the opening of only the shunt to which that OR gate is electrically connected; and
    (b) said second gating means includes
        (1) a plurality of AND gates having a common input connected to the output of said discriminator circuit, and
        (2) a plurality of bistable devices, each of said bistable devices having an input connected to an output of a different AND gate in said plurality of AND gates and an output connected to a different OR gate in said plurality of OR gates in said first gating means.

5. A system as recited in claim 4 wherein said sequencing circuit includes:
   (a) a counter having a plurality of output terminals, each having a signal voltage thereon at a different level of count in said counter;
   (b) conductor means providing electrical connections from each of the plurality of output terminals of said counter to a different OR gate in said plurality of OR gates and to a different AND gate in said plurality of AND gates;
   (c) means for initiating the operation of said counter at the beginning of a distance determination operation; and
   (d) means for halting the operation of said counter at the end of the distance determination operation.

6. A system for determining the distance from a reference point on a railroad track to the nearest car on that track including:
   (a) an A-C excited bridge circuit with
      (1) a first leg having terminals connected to opposite rails of the track at the reference point,
      (2) a second leg connected to said first leg and including a resistance element therein,
      (3) a third leg connected to said second leg and including a capacitive impedance,
      (4) a fourth leg connected between said first leg and said third leg and including an incrementally-adjustable resistance element,
      (5) a discriminator circuit connected from the junction of said first leg and said second leg to the junction of said third leg and said fourth leg, said discriminator being adapted to produce a hold signal only when the voltage-current phase difference at the junction of said second leg is less than the voltage-current phase difference at the junction of said third leg and said fourth leg; and
   (b) a sequencing circuit including
      (1) a counter,
      (2) means for initiating the operation of said counter at the beginning of a distance determination operation;
      (3) first gating means connected to said counter and responsive to different levels of counter output to produce output signals resulting in the temporary addition of different magnitudes of increments to said incrementally-adjustable resistance element, and
      (4) second gating means connected to said discriminator circuit and to said counter and responsive to the simultaneous occurrence of a hold signal and of a signal at a particular level of counter output to cause a particular magnitude of increment to remain in circuit in said fourth leg.

7. A system as recited in claim 6 wherein said incrementally-adjustable resistance element includes:
   (a) a plurality of serially-connected resistors, each having a magnitude weighted to represent a different distance along the railroad track; and
   (b) a plurality of normally-closed shunts, each of said shunts being connected in parallel with one of said plurality of serially-connected resistors and being adapted to be opened by an output signal from said first gating means in said sequencing circuit.

8. A system as recited in claim 7 wherein:
   (a) said first gating means includes a plurality of OR gates, each having an output terminal electrically connected to a different one of said normally closed shunts; and
   (b) said second gating means includes
      (1) a plurality of AND gates having a common input connected to the output of said discriminator circuit and separate inputs connected to said counter, and
      (2) a plurality of bistable devices, each of said bistable devices having an input connected to an output of a different AND gate in said plurality of AND gates and an output connected to a different OR gate in said plurality of OR gates in said first gating means.

References Cited

UNITED STATES PATENTS

| | | | |
|---|---|---|---|
| 791,228 | 5/1905 | Tatum | 246—122 |
| 2,537,298 | 1/1951 | Baughman | 246—122 X |
| 3,082,373 | 3/1963 | Hooke et al. | 324—57 |
| 3,155,350 | 11/1964 | Campbell | 246—122 |
| 3,209,908 | 5/1965 | Hopkins | 324—57 X |
| 3,353,018 | 11/1967 | Gray | 246—122 X |

FOREIGN PATENTS

| | | |
|---|---|---|
| 861,850 | 3/1961 | Great Britain. |

EDWARD E. KUBASIEWICZ, Primary Examiner

U.S. Cl. X.R.

246—122; 324—59